United States Patent [19]

Schläfer et al.

[11] 4,149,850
[45] Apr. 17, 1979

[54] LIQUID PREPARATIONS OF REACTIVE DYESTUFFS

[75] Inventors: Ludwig Schläfer, Fischbach; Konrad Opitz, Liederbach, both of Fed. Rep. of Germany

[73] Assignee: Hoechst Aktiengesellschaft, Frankfurt am Main, Fed. Rep. of Germany

[21] Appl. No.: 875,086

[22] Filed: Feb. 3, 1978

Related U.S. Application Data

[63] Continuation of Ser. No. 656,707, Feb. 9, 1976, abandoned, which is a continuation of Ser. No. 565,738, Apr. 7, 1975, abandoned.

[30] Foreign Application Priority Data

Apr. 9, 1974 [DE] Fed. Rep. of Germany ....... 2417253
Apr. 9, 1974 [DE] Fed. Rep. of Germany ....... 2417254
Apr. 9, 1974 [DE] Fed. Rep. of Germany ....... 2417256
Nov. 20, 1974 [DE] Fed. Rep. of Germany ....... 2454893

[51] Int. Cl.$^2$ .................. C09B 27/00; D06P 1/02
[52] U.S. Cl. ................................. 8/41 R; 8/1 D; 8/1 P; 8/42 R; 8/89 R; 8/92
[58] Field of Search ............... 8/1 D, 1 C, 1 P, 39 R, 8/41 R, 42 R, 89 R, 92

[56] References Cited

U.S. PATENT DOCUMENTS

| 4,072,463 | 2/1978 | Schlafer et al. ................. 8/41 R |
| 4,078,884 | 3/1978 | Opitz et al. ........................ 8/1 D |
| 4,087,245 | 5/1978 | Kramer et al. ................. 8/85 A |

FOREIGN PATENT DOCUMENTS 1558340 2/1969 France.
838335 6/1960 United Kingdom.
880393 10/1961 United Kingdom.

*Primary Examiner*—A. Lionel Clingman
*Attorney, Agent, or Firm*—Curtis, Morris & Safford

[57] ABSTRACT

The present invention provides liquid, aqueous dyeing preparations of a reactive dyestuff which in form of the free acid corresponds to the formula

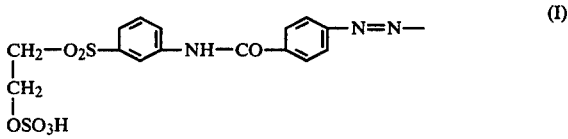

(I)

or to the formula

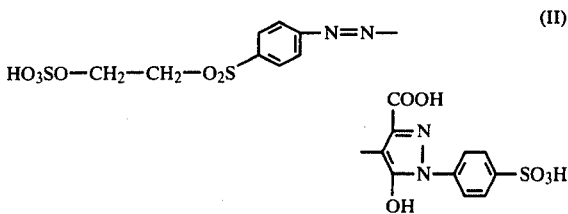

or to the formula

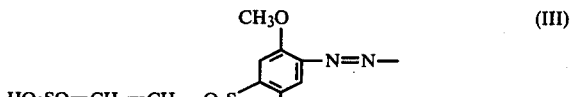

(III)

or to the formula

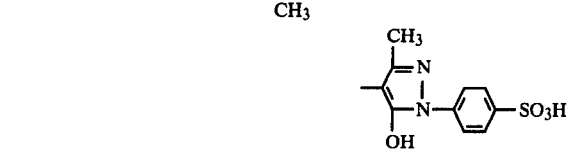

or to the formula

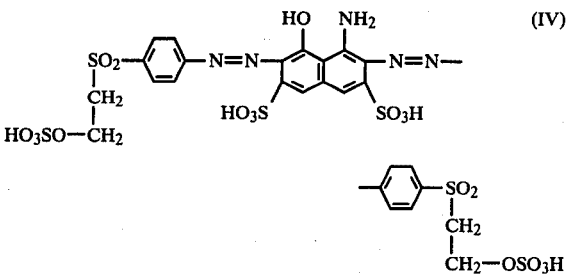

(IV)

or to the formula

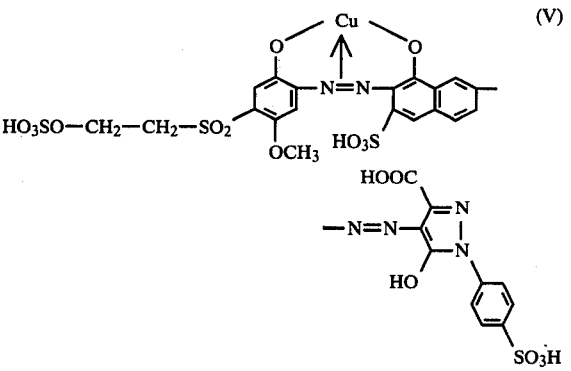

(V)

or to the formula

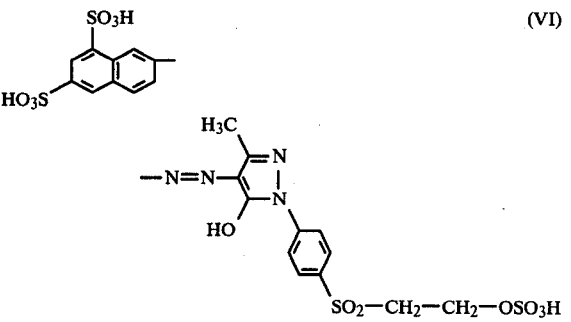

(VI)

each containing 5 to 35% by weight of one of the aforesaid dyestuffs and furthermore 1 to 5% by weight of buffer substances which are not capable of reacting chemically with the reactive group and thus reducing the dyestuff yield, and having a pH-value of from 3 to 7, said dyeing preparations being suitable for the dyeing and printing of fiber materials on the basis of wool, silk, polyamide and natural or regenerated cellulose, according to the process which is common for reactive dyestuffs.

4 Claims, No Drawing

LIQUID PREPARATIONS OF REACTIVE DYESTUFFS

This is a continuation of application Ser. No. 656,707 filed Feb. 9, 1976, now abandoned, which in turn was a continuation of application Ser. No. 565,738 filed Apr. 7, 1975, now abandoned.

The present invention relates to liquid preparations of reactive dyestuffs.

More particularly, the present invention relates to liquid, aqueous dyeing preparations which contain one of the hereinafter mentioned reactive dyestuffs I or II or III or IV or V or VI, which in the form of the free acid correspond either to formula (I)

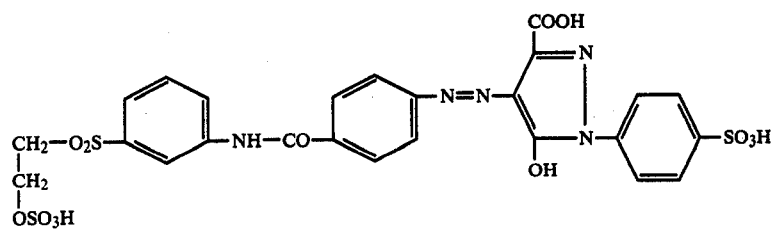

or to formula (II)

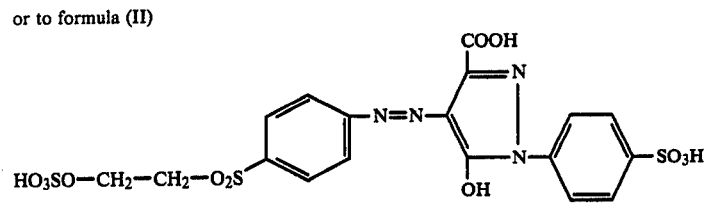

or to formula (III)

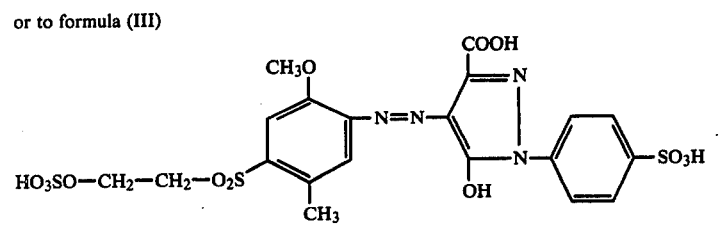

or to formula (IV)

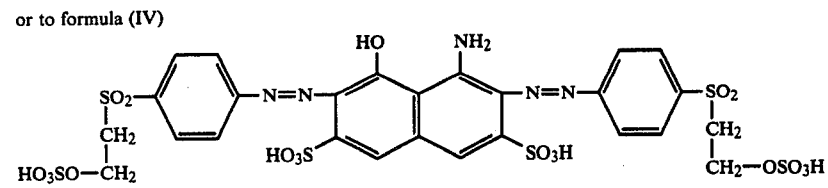

or to formula (V)

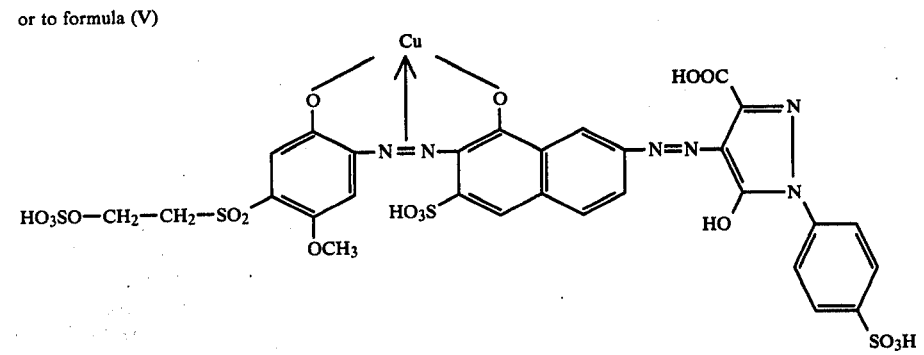

or to formula (VI)

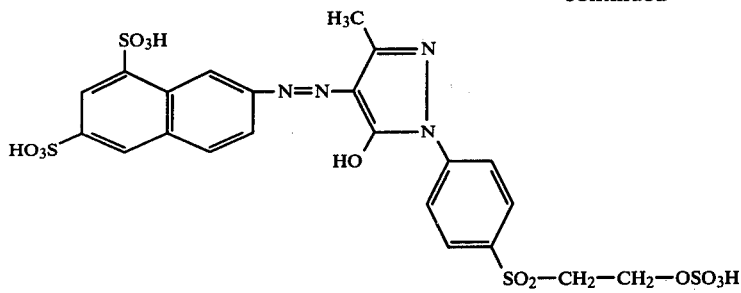

(VI)

These dyeing preparations are characterized by that they contain one of the aforementioned dyestuffs, preferably in the form of their alkali metal salts, in particular sodium salts, in aqueous solution in a concentration of 5 to 35% by weight, preferably 15 to 30% by weight, referred to the pure dyestuff of the formula (I) or (II) or (III) or (IV) or (V) or (VI) and having a pH-value of between 3 and 7, preferably between 5.5 and 6.8, and additionally containing 1 to 5% by weight of buffer substances.

The dyestuff of the formula (I) is described in German Patent Specification DT-PS 1 206 107, Example 1, the dyestuff of the formula (II) is known from German Patent Specification DT-PS No. 1 282 213, Example 1, the dyestuff of the formula (III) is known from German Patent DT-PS No. 1,150,163, Example 1, the dyestuff of the formula (IV) is known from German Auslegeschrift No. 1 619491, Example 8, the dyestuff of the formula (V) is known from German Offenlegungsschrift No. 1,544,538, 1st Example of the Table on page 24, and the dyestuff of the formula (VI) is known from German Offenlegungsschrift No. 1,804,524, Examples 4 and 5.

After their synthesis, water-soluble reactive dyestuffs are commonly isolated in such a way that they are salted out from the aqueous reaction solution, that the precipitated salt-dyestuff mixture is suction-filtered and the press cake obtained is dried. Another technically common method to isolate the dissolved dyestuff, which is usually easy to dissolve in water, from the synthesis solution, is the direct drying, for example the spray drying, of the preparation solution.

For the desired dyeing purpose, the salt-containing dyestuff powder is usually adjusted, after the drying process, to a determined dyestuff content by the admixture of neutral inorganic salts, for example sodium sulfate.

However, these common powder formulations of reactive dyestuffs have several drawbacks which are due particularly to the dust formation of these pulverulent dyeing preparations when they are being handled, for example during emptying or refilling, weighing and measuring, or in the preparation of the dyebaths or printing pastes. In this connection, this dust formation not only represents an annoyance for the workers in the manufacturing plant or the application unit, but in the dyeing or printing processes it may also lead to unpleasant specks of undyed or already dyed merchandise, due to the settling of the dyestuff dust. On the other hand, the dust removal of pulverulent dyestuffs by means of the common dust removing agents on the basis of mineral oil always involves the risk of oily deposits in the dyeing and printing operations, which leads to stained, and thus useless, dyeings and printings. Moreover, these pulverulent dyestuffs often prevent the application of measures of rationalization which are technically desirable, such as, for example, continuous dyeing processes or automatic measuring and weighing devices.

These drawbacks which are equally true for the pulverulent dyestuffs of the formulae (I), (II), (III), (IV), (V) and (VI) are completely avoided by the liquid preparations of the invention of the respective dyestuffs. Moreover, the novel preparations have the advantage, both for the dyestuff producers and those who use them, in comparison with the pulverulent dyestuff formulations, that the salt charge of the waste water is considerably reduced.

The novel liquid dyeing preparations of the dyestuffs of the formula (I), (II), (III), (IV), (V) or (VI) are prepared in such a way - in accordance with the invention - that the clarified dyestuff solution obtained by the synthesis is used directly and is optionally, i.e. advantageously, adjusted to the desired higher dyestuff content, either by concentration, for example, by removal by distillation of a part of the water in vacuo, or advantageously by adding a dried, for example spray-dried, proportion of the same clarified dyestuff solution obtained in the synthesis, in which process buffer substances are also added to this dyestuff solution in all cases.

For the preparation of these dyeing compositions according to the invention which have up to 35% by weight of dyestuff, it is advantageous to use aqueous clarified dyestuff solutions as starting compounds, which have a content of inert salts, such as sodium sulfate or sodium chloride, that is as low as possible and is less than 50% by weight of the dyestuff content of these dyestuff solutions obtained in the synthesis. For the preparation of dyeing compositions having a lower dyestuff content, such as those containing up to 15% by weight of dyestuff, the content of inert salt of the starting solutions should be lower than their dyestuff content. As a rule, the content of inert salt of the aqueous dyestuff solutions obtained in the synthesis is below these limits. In order to keep the content of inert salts below these limits, also for solutions of the reactive dyestuff with the β-sulfatoethylsulfonyl group which has been obtained by esterification of the β-hydroxyethylsulfonyl group with concentrated sulfuric acid, the excess sulfuric acid necessary for the formation of this sulfuric acid semi-ester group cannot be neutralized with sodium hydroxide solution or other reagents which lead to easily soluble inert salts. It is recommended, rather, to neutralize the excess sulfuric acid with calcium carbonate and to separate the dyestuff solution from the sparingly soluble calcium sulfate by way of filtration. This process has been described, inter alia, in German Offenlegungsschriften No. 1.955.849, Example 1; No. 2.049.664, Example 1, and No. 2.060.081, Example 2.

The solutions of the dyestuff of the formula (I), (II), (III), (IV), (V) or (VI) obtained by the synthesis contain from 5 to 15% by weight of dyestuff and may be adjusted to a dyestuff content of from about 30 to 35% by weight by the addition of dried dyestuff or by removal of water by distillation under reduced pressure.

For the dyestuff producer, there is no need anymore for the mother liquors which have a very high content of salt and which are partially saturated with salt, and also for those who use the dyestuffs, the salt content of the waste water is considerably reduced, since the amounts of salt used for the adjustment of the dyestuff powders are no longer required in the preparation of the liquid formulations according to the invention.

For the dyeing preparations of the invention, all buffer substances are suitable that are unable to react chemically with the β-sulfatoethylsulfonyl group, or its vinylsulfonyl analog, which would lead to a reduced dyestuff yield, such as sodium and potassium acetate, sodium and potassium oxalate, the acid sodium and potassium salts of phosphoric acid, mixtures of the different sodium or potassium salts of phosphoric acid, as well as sodium borate. There are preferred sodium borate and disodium-hydrogenophosphate as well as sodium-dihydrogenophosphate.

The mechanism of the reaction of reactive dyestuffs of the above type with cellulose fibers is generally known. Thus, the formation of the covalent bond between the fiber substrate and the dyestuff molecule according to the reaction (4) of the scheme shown below, after conversion of the β-sulfatoethyl-sulfonyl group into the vinyl-sulfone group, in the presence of agents having an alkaline action in accordance with reaction (1), leads to the known good fastness properties of dyeings with these reactive dyestuffs.

Furthermore, it has been known from the use of the reactive dyestuffs with the β-sulfatoethyl-sulfonyl group, that this reactive group, also in the form of its vinyl-sulfonyl group, with water shows a reaction — not only in the presence of alkalies, but also in the acid range — that is concurrent with the dyeing reaction (4) itself, according to reactions (2) or (3) of the scheme, and results in the β-hydroxyethyl-sulfonyl group which is but slow to react with the fiber substrate.

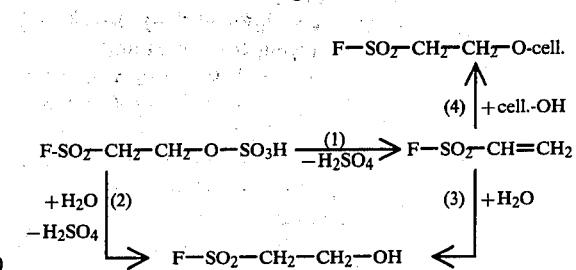

wherein F represents the radical of the dyestuff molecule and m has the above meaning, and cell.—OH stands for the cellulose.

The hydrolysis (2) and the addition of water (3) are practically irreversible under dyeing conditions and thus reduce the dyestuff yield.

For this reason, in the manufacture of water-soluble reactive dyestuffs, the above-mentioned separation and drying of the reactive dyestuffs from the synthesis solution is in general also carried out, with regard to time, too, directly after the synthesis in order to avoid losses of the tinctorial strength.

Thus, it was the more surprising to find that neutral to weakly acidic aqueous buffered solutions, which contain one of the reactive dyestuffs (I) or (II) or (III) or (IV) or (V) or (VI), can be stored over a fairly long period of time without reduction of their tinctorial strength. Aqueous solutions of the dyestuff of the formula (i) or (II) or (III) or (IV) or (V) or (VI) according to the invention yield dyeings and prints unaltered intensity of shade, even after a storage of several months, for example 6 months, at room temperature or after storage of several weeks, for example 8 weeks, at 50° C.

The dyeing preparations of the invention are suitable for the dyeing and printing of fibrous materials of wool, silk, polyamide and natural or regenerated cellulose, or of fiber mixtures containing one or several of the types of fibers mentioned, according to the methods usually employed and well known in the dyeing with reactive dyestuffs, after dilution with water and, optionally, after addition of the usual dyeing auxiliary agents or, in corresponding manner, after addition of the thickeners usually employed in printing and, optionally, of printing auxiliary agents.

The following Examples illustrate the invention.

EXAMPLE 1

150 Parts by weight of an aqueous clarified dyestuff solution of the dyestuff of the following formula (known from German Offenlegungsschrift No. 1.544.538, 1st Example of the Table given on page 24)

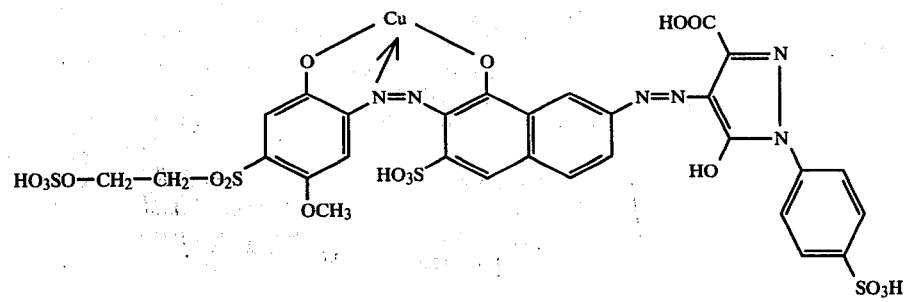

having a pH value of 5.8 and a dyestuff content of 15% by weight, which solution had been obtained in usual manner in the synthesis of the dyestuff by diazotizing and coupling corresponding starting compounds and by way of the complex formation, were mixed, while stirring, with 36 parts by weight of a dry dyestuff powder having a dyestuff content of 70% by weight, the powder having been obtained by spray drying another part of the same clarified dyestuff solution. The 186 parts by weight thus obtained of an aqueous solution containing 25.7% by weight of pure dyestuff yielded, after the addition of 5 parts by weight of disodiumhydrogenophosphate, 191 parts by weight of an aqueous dyeing preparation having a content of pure dyestuff of 25% by weight and a pH value of 6.2.

Using 2 parts by weight of this solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 1 part by weight of a powder formulation containing 50% by weight of pure dyestuff.

This intensity of shade of the prints and dyeings was maintained unaltered when the novel aqueous preparation mentioned above was stored at 50° C. for 6 weeks in a closed vessel.

EXAMPLE 2

200 Parts by weight of an aqueous clarified dyestuff solution of the dyestuff mentioned in Example 1 having a pH value of 5.7 and a dyestuff content of about 11% by weight, which solution had been obtained in usual manner in the synthesis of the dyestuff by diazotizing and coupling corresponding starting compounds and by way of the complex formation, were mixed, while stirring, with 48 parts by weight of a dry dyestuff powder having a dyestuff content of 60% by weight, the powder having been obtained by spray drying another part of the same clarified dyestuff solution. The 248 parts by weight thus obtained of an aqueous solution containing 20.5% by weight of pure dyestuff yielded — after the addition of 6 parts by weight of disodiumhydrogenophosphate — 254 parts by weight of an aqueous dyeing preparation having a content of pure dyestuff of 20% by weight and a pH value of 6.0

Using 5 parts by weight of this solution, dye baths, padding liquors and printing pastes were prepared each time according to known and common processes which — when applied onto cotton and fixed according to methods common for reactive dyestuffs — yielded black or grey dyeings and prints which had the same tinctorial strength as those prepared while using accordingly dye baths, padding liquors or printing pastes of the same concentration, with 2 parts by weight of a powder formulation containing 50% by weight of pure dyestuff.

This tinctorial strength of the prints and dyeings was maintained unaltered when the novel aqueous preparation mentioned above was stored at 20° C. for 3 months in a closed vessel.

EXAMPLE 3

150 Parts by weight of an aqueous clarified dyestuff solution of the dyestuff mentioned in Example 1 having a pH value of 5.8 and a dyestuff content of 15% by weight, which solution had been obtained in usual manner in the synthesis of the dyestuff by diazotizing and coupling corresponding starting compounds and by way of the complex formation, were mixed with 5 parts by weight of disodiumhydrogenophosphate. Of this dyestuff solution, 65 parts by weight of water were distilled off, while stirring at 60° C. and under a vacuum of 18 Torr. 90 Parts by weight of an aqueous dyeing preparation were obtained which had a content of pure dyestuff of 25% by weight and a pH value of 6.4 at 20° C.

Using 2 parts by weight of this solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 1 part by weight of a powder formulation containing 50% by weight of pure dyestuff.

This intensity of shade of the prints and dyeings was maintained unaltered when the novel aqueous preparation mentioned above was stored at 50° C. for 6 weeks in a closed vessel.

EXAMPLE 4

200 Parts by weight of an aqueous clarified dyestuff solution of the dyestuff mentioned in Example 1 having a pH value of 5.7 and a dyestuff content of 11% by weight, which solution had been obtained in usual manner in the synthesis of the dyestuff by diazotizing and coupling corresponding starting compounds and by way of the complex formation, were mixed, while stirring, with 48 parts by weight of a dry dyestuff powder having a dyestuff content of 60% by weight, the powder having been obtained by spray drying another part of the same clarified dyestuff solution. The 248 parts by weight thus obtained of an aqueous solution containing 20.5% by weight of pure dyestuff yielded — after the addition of 6 parts by weight of sodium borate — 254 parts by weight of an aqueous dyeing preparation having a content of pure dyestuff of 20% by weight and a pH value of 5.9.

Using 5 parts by weight of this solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 2 parts by weight of a powder formulation containing 50% by weight of pure dyestuff.

This intensity of shade of the prints and dyeings was maintained unaltered, when the novel aqueous preparation mentioned above was stored at 20° C. for 3 months in a closed vessel.

EXAMPLE 5

200 Parts by weight of an aqueous clarified dyestuff solution of the dyestuff corresponding to the formula

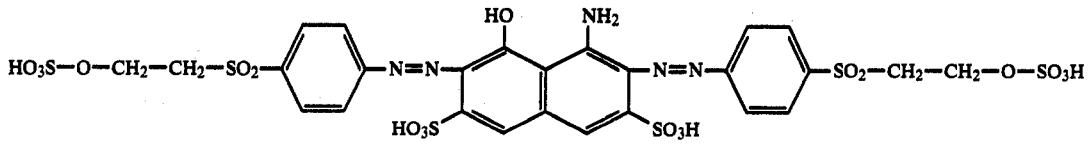

(which has been known from German Auslegeschrift No. 1.619.491, Example 8) and having a pH value of 6.0 and a dyestuff content of 15% by weight, which solution had been obtained in usual manner in the synthesis of the dyestuff by diazotizing and coupling corresponding starting compounds, were mixed, while stirring, with 37 parts by weight of a dry dyestuff powder having a dyestuff content of 67% by weight, the powder having been obtained by spray drying another part of the same clarified dyestuff solution. The 237 parts by weight thus obtained of an aqueous solution containing 23.1% by weight of pure dyestuff and having a pH value of 6.0 yielded — after the addition of 6 parts by weight of disodiumhydrogenophosphate — an aqueous dyeing preparation having a content of pure dyestuff of 22.5% by weight and a pH value of 6.2.

Using 2 parts by weight of this pH-stabilized solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 1 parts by weight of a powder formulation containing 45% by weight of pure dyestuff.

This intensity of shade of the prints and dyeings was maintained unaltered, when the novel aqueous preparation mentioned above was stored at 50° C. for 6 weeks in a closed vessel.

EXAMPLE 6

200 Parts by weight of an aqueous clarified dyestuff solution of the dyestuff mentioned in Example 5 having a pH value of 5.5 and a dyestuff content of about 14.5% by weight, which solution had been obtained in usual manner in the synthesis of the dyestuff by diazotizing and coupling corresponding starting compounds, were mixed, while stirring, with 45 parts by weight of a dry dyestuff powder having a dyestuff content of 64% by weight, the powder having been obtained by spray drying another part of the same clarified dyestuff solution. The 245 parts by weight thus obtained of an aqueous solution containing 23.6% by weight of pure dyestuff yielded — after the addition of 12 parts by weight of disodiumhydrogenophosphate — 257 parts by weight of an aqueous dyeing preparation having a content of pure dyestuff of 22.5% by weight and a pH value of 6.2.

Using 2 parts by weight of this pH-stabilized solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 1 part by weight of a powder formulation containing 45% by weight of pure dyestuff.

This intensity of shade of the prints and dyeings was maintained unaltered, when the novel aqueous preparation mentioned above was stored at 20° C. for 4 months in a closed vessel.

EXAMPLE 7

200 Parts by weight of an aqueous clarified dyestuff solution of the dyestuff mentioned in Example 5 having a pH value of 5.5 and a dyestuff content of 14.5% by weight, which solution had been obtained in usual manner in the synthesis of the dyestuff by diazotizing and coupling corresponding starting compounds, were mixed with 12 parts by weight of disodiumhydrogenophosphate. Of this dyestuff solution, 83 parts by weight of water were distilled off, while stirring at 60° C. and under a vacuum of 18 Torr. 129 Parts by weight of an aqueous dyeing preparation were obtained which had a content of pure dyestuff of 22.5% by weight and a pH value of 6.5 at 20° C.

Using 2 parts by weight of this solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 1 part by weight of a powder formulation containing 45% by weight of pure dyestuff.

This intensity of shade of the prints and dyeings was maintained unaltered, when the novel aqueous preparation mentioned above was stored at 50° C. for 6 weeks in a closed vessel.

EXAMPLE 8

200 Parts by weight of an aqueous clarified dyestuff solution of the dyestuff mentioned in Example 5 having a pH value of 6.0 and a dyestuff content of 12% by weight, which solution had been obtained in usual manner in the synthesis of the dyestuff by diazotizing and coupling corresponding starting compounds, were mixed, while stirring, with 14 parts by weight of a dry dyestuff powder having a dyestuff content of 67% by weight, the powder having been obtained by spray drying another part of the same clarified dyestuff solution. The 214 parts by weight thus obtained of an aqueous solution containing 15.6% by weight of pure dyestuff and having a pH value of 6.0 yielded — after the addition of 8 parts by weight of sodium borate — an aqueous dyeing preparation having a content of pure dyestuff of 15% by weight and a pH value of 6.2.

Using 3 parts by weight of this pH-stabilized solution, dye baths, padding liquors and printing pastes were prepared each time according to known and common processes which — when applied onto cotton and fixed according to methods common for reactive dyestuffs — yielded black or grey dyeings and prints which had the same intensity of shade as those prepared while using accordingly dye baths, padding liquors or printing pastes of the same concentration, with 1 part by weight of a powder formulation containing 45% by weight of pure dyestuff.

This intensity of shade of the print and dyeings was maintained unaltered, when the novel aqueous preparation mentioned above was stored at 20° C. for 4 months in a closed vessel.

EXAMPLE 9

100 Parts by weight of an aqueous clarified dyestuff solution of the dyestuff corresponding to the formula

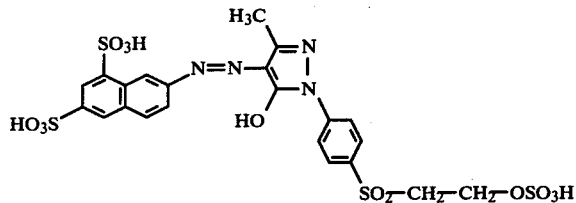

(which has been known from German Offenlegungsschrift No. 1.804.524, Examples 4 and 5) and having a pH value of 6.0 and a dyestuff content of 15% by weight, which solution had been obtained in usual manner in the synthesis of the dyestuff by diazotizing and coupling corresponding starting compounds, were mixed, while stirring, with 24.5 parts by weight of a dry dyestuff powder having a dyestuff content of 67% by weight, the powder having been obtained by spray drying another part of the same clarified dyestuff solution. The 124.5 parts by weight thus obtained of an aqueous solution containing 25.3% by weight of pure dyestuff and having a pH value of 6 yielded — after the addition of 2 parts by weight of disodiumhydrogenophosphate — an aqueous dyeing preparation having a content of pure dyestuff of 25% by weight and again a pH value of 6.0.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same intensity of shade as those prepared while using accordingly dye baths, padding liquors or printing pastes of the same concentration, with 1 part by weight of a powder formulation containing 50% by weight of pure dyestuff.

This intensity of shade of the prints and dyeings was maintained unaltered, when the novel aqueous preparation mentioned above was stored at 50° C. for 6 weeks in a closed vessel.

EXAMPLE 10

200 Parts by weight of an aqueous clarified dyestuff solution of the dyestuff mentioned in Example 9 having a pH value of 5.8 and a dyestuff content of about 13% by weight, which solution had been obtained in usual manner in the synthesis of the dyestuff by diazotizing and coupling corresponding starting compounds, were mixed, while stirring, with 34 parts by weight of a dry dyestuff powder having a dyestuff content of 65% by weight, the powder having been obtained by spray drying another part of the same clarified dyestuff solution. The 234 parts by weight thus obtained of an aqueous solution containing 20.5% by weight of pure dyestuff yielded — after the addition of 6 parts by weight of disodiumhydrogenophosphate — an aqueous dyeing preparation having a content of pure dyestuff of 20% by weight and a pH value of 6.1.

Using 5 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same intensity of shade as those prepared while using accordingly dye baths, padding liquors or printing pastes of the same concentration, with 2 parts by weight of a powder formulation containing 50% by weight of pure dyestuff.

This intensity of shade of the prints and dyeings was maintained unaltered, when the novel aqueous preparation mentioned above was stored at 20° C. for 3 months in a closed vessel.

EXAMPLE 11

200 Parts by weight of an aqueous clarified dyestuff solution of the dyestuff mentioned in Example 9 having a pH value of 6 and a dyestuff content of 13% by weight, which solution had been obtained in usual manner in the synthesis of the dyestuff by diazotizing and coupling corresponding starting compounds, were mixed with 3 parts by weight of disodiumhydrogenophosphate. Of this dyestuff solution, 73 parts by weight of water were distilled off, while stirring at 60° C. and under a vacuum of 18 Torr. 130 Parts by weight of an aqueous dyeing preparation were obtained which had a content of pure dyestuff of 20% by weight and a pH value of 6.1 at 20° C.

Using 5 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same intensity of shade as those prepared while using accordingly dye baths, padding liquors or printing pastes of the same concentration, with 2 parts by weight of a powder formulation containing 50% by weight of pure dyestuff.

This intensity of shade of the prints and dyeings was maintained unaltered when the novel aqueous preparation mentioned above was stored at 20° C. for 3 months in a closed vessel.

EXAMPLE 12

100 Parts by weight of an aqueous clarified dyestuff solution of the dyestuff mentioned in Example 9 having a pH value of 6 and a dyestuff content of 15% by weight, which solution had been obtained in usual manner in the synthesis of the dyestuff by diazotizing and coupling corresponding starting compounds, were mixed, while stirring, with 27 parts by weight of a dry dyestuff powder having a dyestuff content of 67% by weight, the powder having been obtained by spray drying another part of the same clarified dyestuff solution. The 127 parts by weight thus obtained of an aqueous solution containing 26.1% by weight of pure dyestuff yielded — after the addition of 8 parts by weight of sodium borate — an aqueous dyeing preparation having a content of pure dyestuff of 20% by weight and again a pH value of 6.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same intensity of shade as those prepared while using accordingly dye baths, padding liquors or printing pastes of the same concentration, with 1 part by weight of a powder formulation containing 50% by weight of pure dyestuff.

This intensity of shade of the prints and dyeings was maintained unaltered, when the novel aqueous preparation mentioned above was stored at 50° C. for 6 weeks in a closed vessel.

EXAMPLE 13

100 Parts by weight of an aqueous clarified solution of the dyestuff of the above formula (I) having a pH-value of 5.8 and a dyestuff content of about 15% by weight, which solution had been obtained in the usual manner in the synthesis of the dyestuff by diazotization and coupling of corresponding starting compounds, were combined, wwhile stirring, with 19 parts by weight of a dry dyestuff powder having a dyestuff content of 67% by weight and which had been obtained by spray-drying of another part of the same clarified dyestuff solution. The 119 parts by weight of an aqueous solution containing 23.3% by weight of pure dyestuff and having a pH-value of 5.8 yielded, after addition of 4 parts by weight of disodium-hydrogenophosphate, an aqueous dyeing preparation having a content of pure dyestuff of 22.5% by weight and a pH-value of 6.0.

Using 2 parts by weight of this pH-stabilized solution, dyebaths, padding liquors and printing pastes were prepared in known and usual manner, which when applied and fixed on cotton according to the methods usually employed for reactive dyestuffs, yielded yellow dyeings and prints which had the same depth or shade as those prepared using dyebaths, padding liquors or printing pastes of the same concentration and that had been prepared with 1 part by weight of a powder formulation containing 45% by weight of pure dyestuff.

This intensity of shade of the prints and dyeings was unaltered even if the novel aqueous preparation mentioned above had been stored for 6 weeks at 50° C. in a closed vessel.

EXAMPLE 14

100 Parts by weight of an aqueous clarified dystuff solution of the dyestuff of the above formula (I) having a pH-value of 5.8 and a dyestuff content of about 13% by weight, which solution had been obtained in the usual manner by the synthesis of the dyestuff by diazotization and coupling of corresponding starting substances, were mixed, while stirring, with 17 parts by weight of a dry dyestuff powder having a dyestuff content of 65% by weight and which had been obtained by spray-drying of another part of the same clarified dyestuff solution. The 117 parts by weight so obtained of the aqueous solution containing 20.5 parts by weight of pure dyestuff yielded, after addition of 3 parts by weight of sodium bicarbonate, an aqueous dyeing preparation having a content of pure dyestuff of 20.0% by weight and a pH-value of 6.1.

Using 5 parts by weight of this pH-stabilized solution, dyebaths, padding liquors and printing pastes were prepared in known and usual manner, which when applied and fixed on cotton according to the methods usually employed for reactive dyestuffs, yielded yellow dyeings and prints which had the same depth of shade as those prepared using dyebaths, padding liquors and printing pastes of the same concentration and that had been prepared with 2 parts by weight of a powder formulation containing 50% by weight of pure dyestuff.

This shade intensity of the prints and dyeings was unaltered even if the novel aqueous preparation mentioned above had been stored for 3 months at 20° C. in a closed vessel.

EXAMPLE 15

200 Parts by weight of an aqueous clarified dyestuff solution of the dyestuff of the above formula (I) having a pH-value of 6.0 and a dyestuff content of 12% by weight, which solution had been obtained in the usual manner by the synthesis by diazotization and coupling of corresponding starting substances, were mixed with 3 parts by weight of disodium-hydrogeno-phosphate. 96.5 Parts by weight of water were removed from this dyestuff solution by distillation, while stirring, at 60° C. and under a reduced pressure of 18 Torr. 106.5 Parts by weight of an aqueous dyeing preparation were obtained which had a content of pure dyestuff of 22.5% by weight and a pH-value of 6.1 at 20° C.

Using 2 parts by weight of this solution, dyebaths, padding liquors and printing pastes were prepared in the usual and known manner, which when applied and fixed on cotton according to the methods usually employed for reactive dyestuffs, yielded yellow dyeings and prints which had the same depth of shade as those produced using dyebaths, padding liquors and printing pastes of the same concentration and that had been prepared with 1 part by weight of a powder formulation containing 45% by weight of pure dyestuff.

This intensity of shade of the dyeings and prints was obtained with unaltered quality when the above-indicated novel aqueous preparation had been stored for 3 months at 20° C. in a closed vessel.

EXAMPLE 16

100 Parts by weight of an aqueous clarified dyestuff solution of the dyestuff of the above formula (I) having a pH-value of 6.0 and a dyestuff content of 13% by weight, and which had been obtained in the usual manner in the synthesis of the dyestuff by diazotizing and coupling corresponding starting substances, were mixed, while stirring, with 25 parts by weight of a dry dyestuff powder which had a dyestuff content of 65% by weight and had been obtained by spray-drying of another part of the same clarified dyestuff solution. The 125 parts by weight so obtained of an aqueous solution containing 23.4% by weight of pure dyestuff yielded, after addition of 5 parts by weight of sodium borate, an aqueous dyeing preparation which showed a content of pure dyestuff of 22.5% by weight and a pH-value of 6.0.

Using 2 parts by weight of this pH-stabilized solution, dyebaths, padding liquors and printing pastes were prepared which, when applied and fixed on cotton according to the methods usually employed for reactive dyestuffs, yielded yellow dyeings and prints which had the same depth of shade as those produced with dyebaths, padding liquors and printing pastes of the same concentration but had been prepared with 1 part by weight of a powder formulation containing 45% by weight of pure dyestuff.

This intensity of shade of the dyeings and prints was obtained with unaltered quality, when the above-indicated novel aqueous preparation had been stored for 6 weeks at 50° C. in a closed vessel.

EXAMPLE 17

100 Parts by weight of an aqueous, clarified dyestuff solution of the dyestuff of the above formula (I) having a pH-value of 6.0 and a dyestuff content of 13% by weight, and which had been obtained in the usual manner in the synthesis of the dyestuff by diazotizing and coupling corresponding starting substances, were mixed, while stirring, with 12 parts by weight of a dry dyestuff powder which had a dyestuff content of 60% by weight and which had been obtained by spray-drying of another part of the same clarified dyestuff solution. The 122 parts by weight so obtained of an aqueous solution containing 18% by weight of pure dyestuff and having a pH-value of 6.0 yielded, after addition of 4 parts by weight of disodium-hydrogenophosphate, an aqueous dyeing preparation which had a content of pure dyestuff of 17.5% by weight and a pH-value of 6.3.

Using 2 parts by weight of this pH-stabilized solution, dyebaths, padding liquors and printing pastes were prepared in the usual and known manner, which, when applied and fixed on cotton according to the methods usually employed for reactive dyestuffs yielded yellow dyeings and prints which had the same depth of shade as those produced with dyebaths, padding liquors and printing pastes of the same concentration but which had been prepared with 1 part by weight of a powder formulation containing 35% of pure dyestuff.

This intensity of shade of the dyeings and prints was obtained with unaltered quality when the above-indicated novel aqueous preparation had been stored for 6 weeks at 50° C. in a closed vessel.

EXAMPLE 18

200 Parts by weight of an aqueous, clarified dyestuff solution of the dyestuff of the above formula (II) having a pH-value of 5.8 and a dyestuff content of about 13% by weight, and which had been obtained in the usual manner in the synthesis of the dyestuff by diazotizing and coupling of corresponding starting substances, were mixed, while stirring, with 44 parts by weight of a dry dyestuff powder having a dyestuff content of 54% by weight and which had been obtained by spray-drying of another part of the same clarified dyestuff solution. The 244 parts by weight so obtained of an aqueous solution containing 20.4% by weight of pure dyestuff yielded, after addition of 5 parts by weight of disodium-hydrogenophosphate, an aqueous dyeing preparation which had a content of pure dyestuff of 20.0% by weight and a pH-value of 6.1.

Using 2 parts by weight of this pH-stabilized solution, dyebaths, padding liquors and printing pastes were prepared which, when applied and fixed on cotton according to the methods usually employed for reactive dyestuffs yielded yellow dyeings and prints which had the same depth of shade as those produced with dyebaths, padding liquors and printing pastes of the same concentration but which had been prepared with 1 part by weight of a powder formulation containing 40% of pure dyestuff.

This intensity of shade of the dyeings and prints was obtained in unaltered quality when the above-indicated novel aqueous preparation had been stored for 3 months at 20° C. in a closed vessel.

EXAMPLE 19

200 Parts by weight of an aqueous, clarified dyestuff solution of the dyestuff of the above formula (II) having a pH-value of 6.0 and a dyestuff content of 15% by weight, which had been obtained in the usual manner in the synthesis of the dyestuff by diazotizing and coupling corresponding starting compounds, were mixed with 5 parts by weight of disodium-hydrogenophosphate. 55 Parts by weight of water were eliminated from this dyestuff solution by distillation, while stirring, at 60° C. and under a reduced pressure of 18 Torr. 150 Parts by weight of an aqueous dyeing preparation were obtained, which had a content of pure dyestuff of 20% by weight and a pH-value of 6.3 at 20° C.

Usin 2 parts by weight of this solution, cyabaths, padding liquors and printing pastes were prepared in the known and usual manner, which, when applied and fixed on cotton in the manner usually employed for reactive dyestuffs, yielded yellow dyeings and prints which had the same depth of shade as those produced with dyebaths, padding liquors and printing pastes of the same concentration but which had been prepared with 1 part by weight of a powder formulation containing 40% of pure dyestuff.

This intensity of shade of the dyeings and prints was obtained with unaltered quality when the above-indicated novel aqueous preparation had been stored for 3 months at 20° C. in a closed vessel.

EXAMPLE 20

100 Parts by weight of an aqueous, clarified dyestuff solution of the dyestuff of the above formula (II) having a pH-value of 6.0 and a dyestuff content of 15% by weight, which had been prepared in the usual manner in the synthesis of the dyestuff by diazotization and couplin of the corresponding starting substances, were mixed, while stirring, with 15 parts by weight of a dry dyestuff powder having a dyestuff content of 60% by weight and prepared by spray-drying of another part of the same clarified dyestuff solution. The 115 parts by weight so obtained of an aqueous solution containing 20.8% by weight of pure dyestuff yielded, after addition of 5 parts by weight of sodium borate, an aqueous dyeing preparation which had a content of pure dyestuff of 20% by weight and a pH-value of 6.0.

Using 2 parts of weight of this pH-stabilized solution, dyebaths, padding liquord and printing pastes were prepared in the known and usual manner, which, when applied and fixed on cotton in the manner usually employed for reactive dyestuffs, yielded yellow dyeings and prints which had the same depth of shade as those produced with dyebaths, padding liquors or printing pastes of the same concentration but which had been prepared with 1 part by weight of a powder formulation containing 40% by weight of pure dyestuff.

This intensity of shade of the prints and dyeings was obtained with unaltered quality when the above-indicated novel aqueous preparation had been stored for 6 weeks at 50° C. in a closed vessel.

EXAMPLE 21

100 Parts by weight of an aqueous clarified dyestuff solution of the dyestuff of the above formula (III) having a pH-value of 5.7 and a dyestuff content of 12% by weight, which had been obtained in the usual manner in the synthesis of the dyestuff by diazotization and coupling of the corresponding starting substances, were mixed, while stirring, with 24.5 parts by weight of a dry dyestuff powder having a dyestuff content of 70% by weight and which had been obtained by spray-drying of another part of the same clarified dyestuff solution. The 124.5 parts by weight so obtained of an aqueous solution containing 23.4% by weight of pure dyestuff and having a pH-value of 5.7, yielded after addition of 5 parts by weight of disodium-hydrogenophosphate an aqueous dyeing preparation which had a content of pure dyestuff of 22.5% by weight and a pH-value of 6.0.

Using 2 parts by weight of this pH-stabilized solution, dyebaths, padding liquord and printing pastes were prepared in the known and usual manner, which, when applied and fixed on cotton according to the methods usually employed for reactive dyestuffs, yielded yellow dyeings and prints which had the same depth of shade as those produced with dyebaths, padding liquors or printins pastes of the same concentration but which had been prepared with 1 part by weight of powder formulation containing 45% by weight of pure dyestuff.

This intensity of shade of the dyeings and print was obtained with unaltered quality when the above-indicated novel aqueous preparation had been stored for 6 weeks at 50° C. in a closed vessel.

EXAMPLE 22

200 Parts by weight of an aqueous, clarified dyestuff solution of the dyestuff of the above formula (III) having a pH-value of 5.8 and a dyestuff content of about 13% by weight, which had been obtained in the usual manner in the synthesis of the dyestuff by diazotization and coupling of corresponding starting compounds, were mixed, while stirring, with 34 parts by weight of a dry dyestuff powder having a dyestuff content of 64% by weight and prepared by spray-drying of another part of the same clarified dyestuff solution. The 234 parts by weight so obtained of an aqueous solution containing 20.4% by weight of pure dye-stuff yielded, after addition of 5 pars by weight of disodium-hydrogenophosphate, an aqueous dyeing preparation which had a content of pure dyestuff of 20.0% by weight and a pH-value of 6.1.

Using 5 parts by weight of this pH-stabilized solution, dyebaths, padding liquors and printing pastes were prepared in known and usual manner which, when applied and fixed on cotton according to the methods usually employed for reactive dyestuffs, yielded yellow dyeings and prints which had the same depth of shade as those produced with dyebaths, padding liquors or printing pastes of the same concentration but which had been prepared with 2 parts by weight of a powder formulation containing 50% of pure dyestuff.

This intensity of shade of the prints and dyeings was obtained with unaltered quality, when the above-indicated novel aqueous preparation had been stored for 3 months at 20° C. in a closed vessel.

EXAMPLE 23

200 Parts by weight of an aqueous clarified dyestuff solution of the dyestuff of the above formula (III) having a pH-value of 6.0 and a dyestuff content of 13% by weight, which had been obtained in the usual manner in the synthesis of the dyestuff by diazotization and coupling of corresponding starting substances, were mixed with 3 parts by weight of disodium-hydrogenophosphate. 87.5 Parts by weight of water were eliminated from this dyestuff solution by distillation, while stirring, at 60° C. and under a reduced pressure of 18 Torr. 115.5 Parts by weight of an aqueous dyeing preparation were obtained which had a content of pure dyestuff of 22.5% by weight and a pH-value of 6.1 at 20° C.

Using 2 Parts by weight of this solution, dyebaths, padding liquors and printing pastes were prepared in known and usual manner and yielded, when applied and fixed on cotton according to the methods usually employed for reactive dyestuffs, yellow prints and dyeings which had the same depth of shade as those produced with dyebaths, padding liquors or printings pastes of the same concentration, but which had been prepared with 1 part by weight of a powder formulation containing 45% by weight of pure dyestuff.

This intensity of shade of the prints and dyeings was obtained with unaltered quality when the above-indicated aqueous preparation had been stored for 3 months at 20° C. in a closed vessel.

EXAMPLE 24

100 Parts by weight of an aqueous, clarified dyestuff solution of the dyestuff of the above formula (III) having a pH-value of 6.0 and a dyestuff content of 12% by weight, which had been obtained in the usual manner in the synthesis of the dyestuff by diazotization and coupling of corresponding starting compounds, were mixed, while stirring, with 25 parts by weight of a dry dyestuff powder having a dyestuff content of 70% by weight and obtained by spray-drying of another part of the same clarified dyestuff solution. The 125 parts by weight so obtained of an aqueous solution containing 23.9% by weight of pure dyestuff yielded, after addition of 6 parts by weight of sodium borate, an aqueous dyeing preparation which had a content of pure dye-stuff of 22.5% by weight and a pH-value of 6.0.

Using 2 parts by weight of this pH-stabilized solution, dyebaths, padding liquors and printing pastes were prepared in known and usual manner, which, when applied and fixed on cotton according to the methods usually employed for reactive dyestuffs, yielded yellow dyeings and prints which had the same depth of shade as those produced with dyebaths, padding liquors or printing pastes of the same concentration, but which had been prepared with 1 part by weight of a powder formulation containing 45% by weight of pure dyestuff.

This intensity of shade of the prints and dyeings was obtained with unaltered quality, when the above-indicated novel aqueous preparation had been stored for 6 weeks at 50° C. in a closed vessel.

We claim:

1. A liquid, aqueous dyeing preparation of a reactive dyestuff, containing 5 to 35% by weight of the dyestuff of the formula (I) or of the dyestuff of the formula (II) or of the dyestuff of the formula (III) or of the dyestuff of the formula (IV) or of the dyestuff of the formula (V) or of the dyestuff of the formula (VI), which in form of its free acid corresponds to the formula

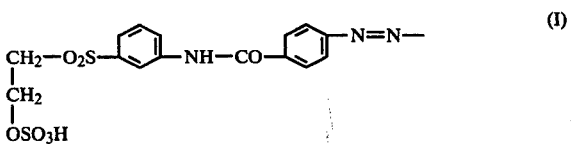

or to the formula

-continued

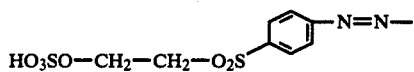 (II)

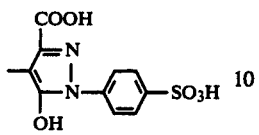

or to the formula

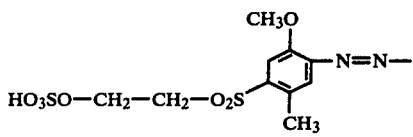 (III)

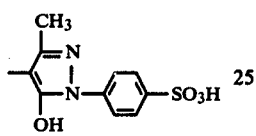

or to the formula

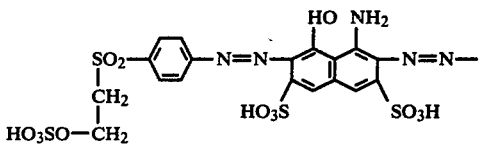 (IV)

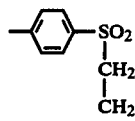

or to the formula

-continued (V)

(VI)

and furthermore containing 1 to 5% by weight of a buffer compound which is not capable of reacting chemically with the reactive group, and has a pH-value of from 3 to 7.

2. A dyeing preparation as claimed in claim 1, which contains a buffer substance selected from the group consisting of sodium acetate, potassium acetate, sodium oxalate, potassium oxalate, acid and sodium and potassium salts of phosphoric acid and sodium borate.

3. Dyeing preparations as claimed in claim 1, which contain sodium borate.

4. Dyeing preparations as claimed in claim 1, which contain sodium-dihydrogenophosphate and/or disodium-hydrogenophosphate.

* * * * *